United States Patent [19]
Noda et al.

[11] Patent Number: 5,198,637
[45] Date of Patent: Mar. 30, 1993

[54] METHOD OF CUTTING GROOVES IN HYDRODYNAMIC BEARING MADE OF CERAMIC MATERIAL

[75] Inventors: Yumiko Noda, Kanagawa; Ichiro Kamiya, Tokyo; Manabu Toshimitsu, Kanagawa; Yoshio Sato; Ryoichi Shinjo, both of Kanagawa, all of Japan

[73] Assignee: Ebara Corporation, Tokyo, Japan

[21] Appl. No.: 801,664

[22] Filed: Dec. 2, 1991

[30] Foreign Application Priority Data

Nov. 30, 1990 [JP] Japan .................. 2-337846

[51] Int. Cl.$^5$ ............................................. B23K 26/00
[52] U.S. Cl. ............................ 219/121.69; 219/121.66
[58] Field of Search ..................... 219/121.68, 121.69, 219/121.82, 121.78; 384/117, 224

[56] References Cited

U.S. PATENT DOCUMENTS

| 5,054,938 | 10/1991 | Ide | 384/117 |
| 5,102,237 | 4/1992 | Ide | 384/224 |
| 5,137,373 | 8/1992 | Ide | 384/117 |

Primary Examiner—C. L. Albritton
Attorney, Agent, or Firm—Wenderoth, Lind & Ponack

[57] ABSTRACT

A ceramic hydrodynamic bearing used as a radial or a thrust bearing in a spindle motor for a hard disk driver. The bearing includes a ceramic bearing base having hydrodynamic pressure generating grooves. A sliding surface of the bearing base is irradiated with an energy beam with a high energy density to remove said material, thereby forming hydrodynamic pressure generating groove, and at the same time the grooves are coated with a modification layer that is formed by melting the ceramic material that constitutes said ceramic bearing base with the energy beam and by solidifying said ceramic bearing base.

9 Claims, 5 Drawing Sheets

METHOD OF CUTTING GROOVES IN HYDRODYNAMIC BEARING MADE OF CERAMIC MATERIAL

BACKGROUND OF THE INVENTION

The present invention relates to a method of cutting grooves in a ceramic hydrodynamic bearing which is suitably used as radial and thrust bearings for a rotating member that rotates at high speed.

Recently, with the increase in the speed of spindle motors for HDDs (Hard Disk Drivers), radial and thrust bearings of high performance have been demanded, and employment of ceramic hydrodynamic bearings has been proposed as one technique to meet the demand. In the ceramic hydrodynamic bearings, it is essential to minimize the absolute value of the number of fine particles generated from the sliding surface.

Hitherto, shot blasting process has been mainly employed as a method of cutting hydrodynamic pressure generating grooves in the sliding surface of such a ceramic hydrodynamic bearing.

However, if groove cutting is effected by shot blasting process, cuticles (pineal) $2b$ are formed on the surface of the machined portion, that is, the portion formed with a hydrodynamic pressure generating groove $2$, as shown in FIG. 3, so that the abrasive or cuttings are caught between the cuticles $2b$ and it is not easy to wash them off. The abrasive or cuttings that are left unremoved by washing constitute a large source of generation of fine particles. Meantime, cuticles themselves, which are likely to separate, constitute a source of generation of fine particles. In addition, a large number of microcracks are generated under some shot blasting conditions, and these microcracks invite an increase in the amount of fine particles.

JP. A, 58-179588 discloses a method of forming grooves in a ceramic hydrodynamic bearing wherein a laser beam is irradiated only to the required place to form the grooves. The burrs at circumferential edges of each groove are removed by finishing after forming grooves.

SUMMARY OF THE INVENTION

In view of these circumstances, it is an object of the present invention to solve the above-described problems of the prior art and provide a method of cutting grooves in a ceramic hydrodynamic bearing which is designed so that it is possible to reduce the amount of fine particles generated from the surface that is formed with hydrodynamic pressure generating grooves or it is possible to eliminate the generation of such fine particles. The other object of the present invention is to provide a method of cutting grooves in the above-described ceramic hydrodynamic bearing without generating burrs at the edges of the grooves.

To attain the above-described object, the present invention provides a method of cutting grooves in a ceramic hydrodynamic bearing including a ceramic bearing base having hydrodynamic pressure generating grooves with a predetermined configuration formed in a sliding surface thereof The inner surfaces of the hydrodynamic pressure generating grooves have a cross-sectional configuration that the depth is from 3 to 20 $\mu$m and the ratio of the depth to the width is from $10^{-4}$ to $10^{-2}$. The inner surfaces are coated with a modification layer that is formed by melting and solidifying a ceramic material that constitutes the ceramic bearing base.

In the method of cutting grooves in a ceramic hydrodynamic bearing, a sliding surface of a bearing base made of a ceramic material is irradiated with an energy beam with a high energy density from an energy beam irradiation device to remove the ceramic material, thereby forming hydrodynamic pressure generating grooves with a predetermined configuration, and at the same time, coating the inner surfaces of the hydrodynamic pressure generating grooves with a modification layer that is formed by melting and solidifying the ceramic material of the bearing base.

A Q-switch YAG laser device may be employed as the energy beam irradiation device to apply a YAG pulse laser beam with a mean power of 100 Watt and downward, a pulse repetition of 3 to 10 kHz, and an energy density of not higher than 300 J/cm$^2$ for a ceramic material of SiC or Si$_3$N$_4$, and an energy density of 200 to 600 J/cm$^2$ for a ceramic material of Al$_2$O$_3$, thereby forming the hydrodynamic pressure generating grooves and, at the same time, forming the modification layer on the surfaces thereof without generating burrs at the edges of the grooves.

An excimer laser device may be employed as the energy beam irradiation device to apply an excimer laser beam with an appropriate energy density, thereby forming the hydrodynamic pressure generating grooves and, at the same time, forming the modification layer on the surfaces thereof.

Since the inner surfaces of the hydrodynamic pressure generating grooves are coated with a modification layer that is formed by melting and solidifying the ceramic material that constitutes the bearing base of the ceramic hydrodynamic bearing, the surface of the modification layer is extremely smooth, so that there is no possibility that cuticles (pineal) will be formed on the surface of the machined portion as in the prior art wherein groove cutting is effected by shot blasting process which is attended with the problem that the cuticles themselves, or the abrasive or cuttings that are caught between the cuticles, constitute a large source of generation of fine particles.

In addition, a Q-switch YAG laser device is employed to apply a YAG pulse laser beam with a mean power of 100 Watt and downward, a pulse repetition of 3 to 10 kHz, and an energy density of not higher than 300 J/cm$^2$ for a ceramic material of SiC or Si$_3$N$_4$, and an energy density of 200 to 600 J/cm$^2$ for a ceramic material of Al$_2$O$_3$, thereby removing the ceramic base material in the irradiated portion, and thus forming hydrodynamic pressure generating grooves and, at the same time, coating the surfaces of the grooves with a modification layer which is formed by melting and solidifying the ceramic base material. Accordingly, it is possible to produce a ceramic hydrodynamic bearing with no or minimal generation of fine particles extremely easily.

DETAILED DESCRIPTION OF THE PREFERRED EMBODIMENTS

One embodiment of the present invention will be described below with reference to the accompanying drawings.

Figure 1:
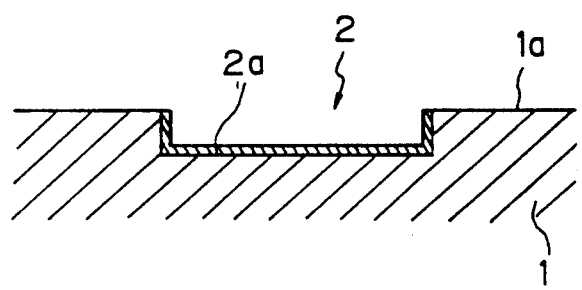
FIG. 1 is a sectional view of a hydrodynamic pressure generating groove portion of the present invention.
Figure 2:
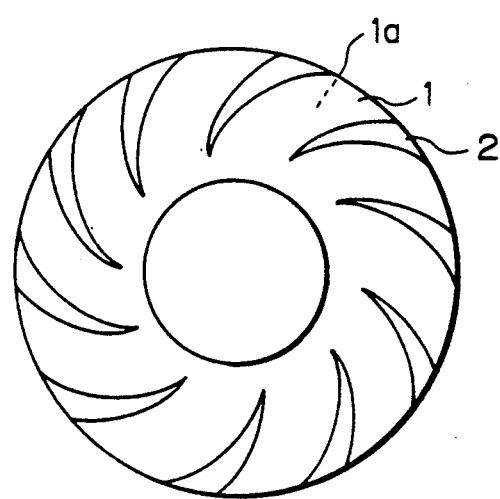
FIG. 2 is a plan view of a ceramic hydrodynamic thrust bearing according to the present invention.
Figure 3:
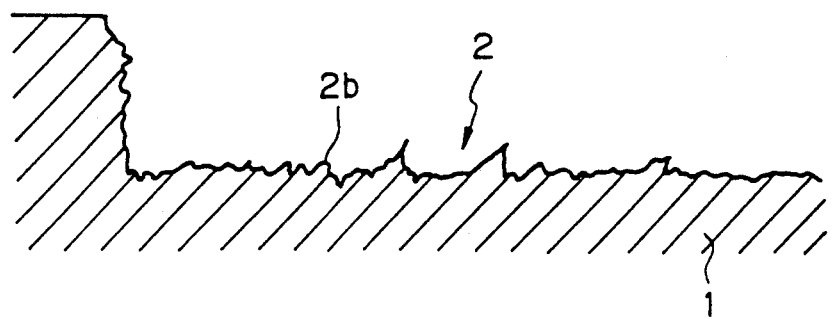
FIG. 3 is a view for explanation of the groove surface cut by shot blasting according to the prior art.
Figure 4:
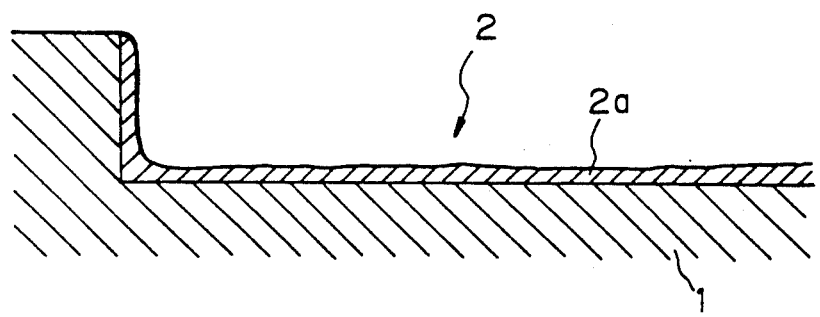
FIG. 4 is a view for explanation of the groove surface cut by the groove cutting method of the present invention.
Figure 5:
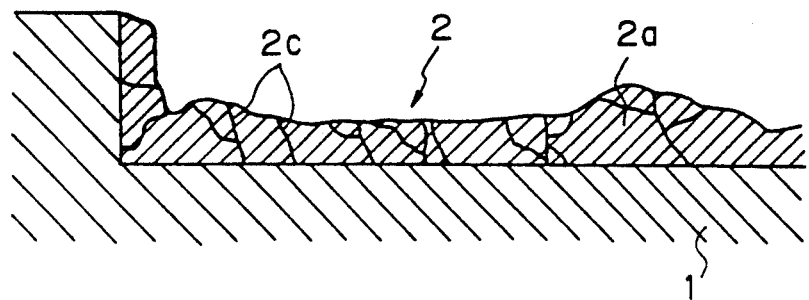
FIG. 5 is a view for explanation of the groove surface that is formed in a case where the laser energy density is excessively high.

FIG. 2 is a plan view of a ceramic hydrodynamic thrust bearing produced by the method of cutting grooves in a ceramic hydrodynamic bearing according to the present invention, and FIG. 1 is a sectional view of a hydrodynamic pressure generating groove portion of the thrust bearing. As shown in these figures, a sliding surface 1a of a ceramic bearing base 1 is formed with hydrodynamic pressure generating grooves 2. The hydrodynamic pressure generating grooves 2 are spiral grooves disposed at predetermined spacings in the circumferential direction. The inner surface of each hydrodynamic pressure generating groove 2 is coated with a thin modification layer 2a that is formed by melting and solidifying a ceramic material that constitutes the ceramic bearing base 1. The hydrodynamic pressure generating grooves 2a and the modification layer 2a are formed on the sliding surface 1a of the ceramic bearing base 1 by applying a Q-switch YAG pulse laser beam to the surface of the ceramic bearing base 1 made of SiC in the shape of the hydrodynamic pressure generating grooves 2 to thereby remove the base material in the portions irradiated with the laser beam. In this case, the power density of the Q-switch YAG pulse laser beam is set to be not higher than 300 J/cm$^2$, whereby at the same time as the hydrodynamic pressure generating grooves 2 are formed in the sliding surface 1a of the bearing base 1, the modification layer 2a is formed on the surfaces of the grooves 2 from the ceramic base material that is melted and then solidified. If the energy density of the laser beam exceeds 300 J/cm$^2$, microcracks 2c are generated in the solidified modification layer 2, as shown in FIG. 5, and the solidified layer becomes extremely thick. For this reason, it is necessary in order to form a modification layer 2a with a smooth surface, as shown in FIG. 4, to set the energy density at a level which is not higher than 300 J/cm$^2$ and at which the base material can be removed.

Figure 6:
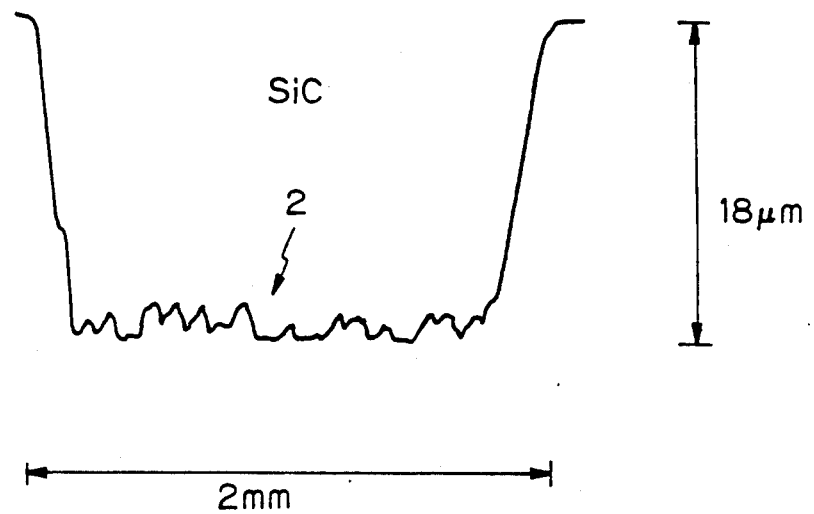
FIG. 6 is a view schematically showing a cross-section of a groove formed by a YAG pulse laser under first condition.

FIG. 6 shows a cross-section of a groove 2 formed by a YAG pulse laser under the following conditions.
Material of sliding surface 1: SiC
Mean power of the pulse laser: 36 Watt
Pulse repetition of the pulse laser: 10 kHz
Energy density of the pulse laser: 250 J/cm$^2$ The groove shown in FIG. 6 has a cross-sectional configuration that the depth is about 18 μm and the width is about 2 mm, and no burrs along the groove.

Figure 7:
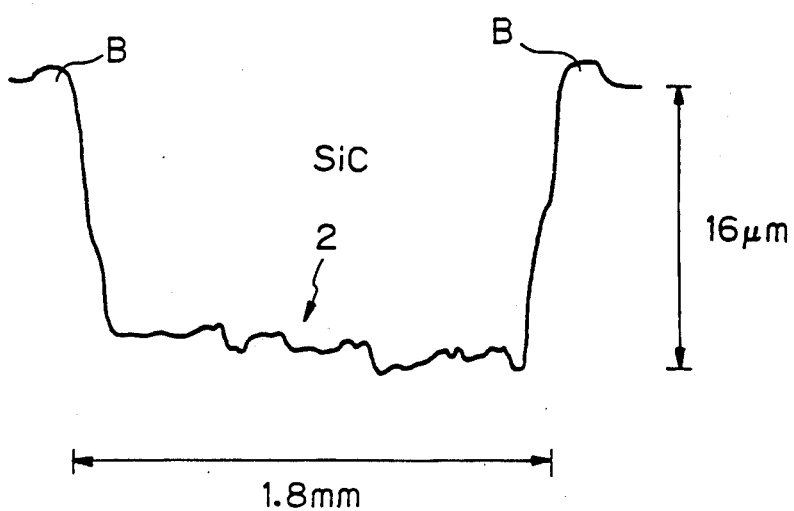
FIG. 7 is a view similar to FIG. 6 under second condition.

FIG. 7 shows a cross-section of a groove 2 formed by a YAG pulse laser under the following conditions.
Material of sliding surface 1: SiC
Mean power of the pulse laser: 27 Watt
Pulse repetition of the pulse laser: 5 kHz
Energy density of the pulse laser: 320 J/cm$^2$ The groove shown in FIG. 7 has a cross-sectional configuration that the depth is about 16 μm and the width is about 1.8 mm, and has burrs B along the edges of the groove.

Figure 8:
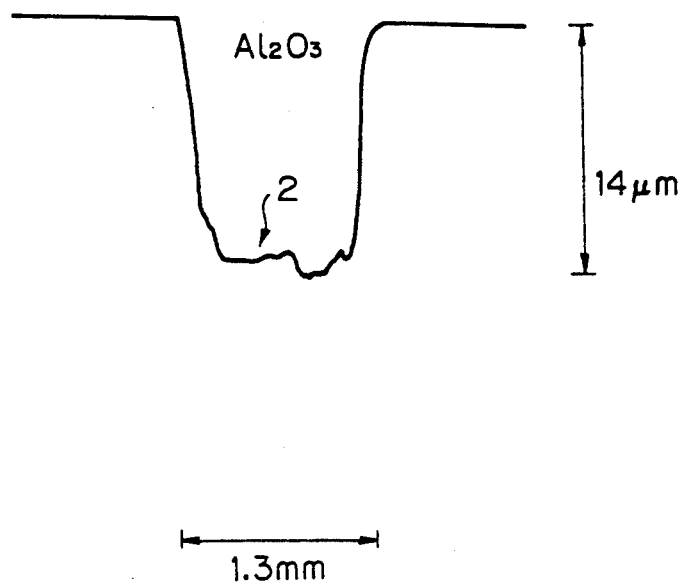
FIG. 8 is a view schematically showing a cross-section of a groove formed by a YAG pulse laser under third condition.

FIG. 8 shows a cross-section of a groove 2 formed by a YAG pulse laser under the following conditions.
Material of sliding surface 1: Al$_2$O$_3$
Mean power of the pulse laser: 60 Watt
Pulse repetition of the pulse laser: 10 kHz
Energy density of the pulse laser: 400 J/cm$^2$ The groove shown in FIG. 8 has a cross-sectional configuration that the depth is about 14 μm and the width is about 1.3 mm, and no burrs along the groove.

Figure 9:
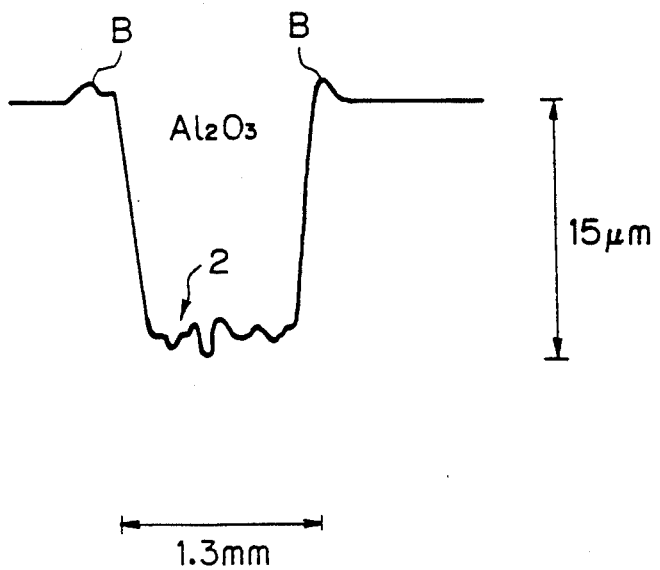
FIG. 9 is a view similar to FIG. 8 under fourth condition.

FIG. 9 shows a cross-section of a groove 2 formed by a YAG pulse laser under the following conditions.
Material of sliding surface 1: Al$_2$O$_3$
Mean power of the pulse laser: 60 Watt
Pulse repetition of the pulse laser: 10 kHz
Energy density of the pulse laser: 800 J/cm$^2$ The groove shown in FIG. 9 has a cross-sectional configuration that the depth is about 15 μm and the width is about 1.3 mm, and has burrs B along the edges of the groove.

Figure 10:
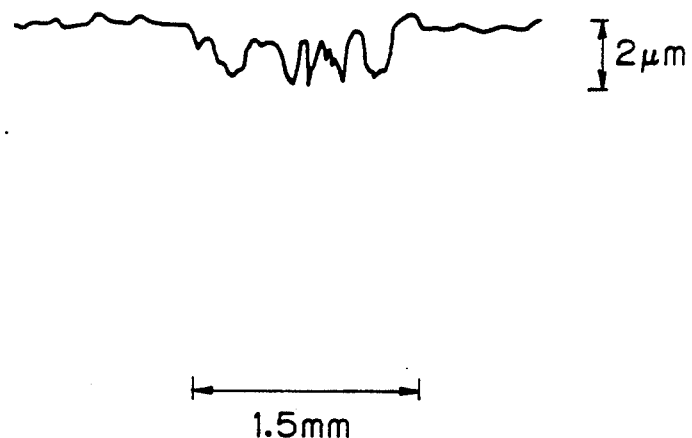
FIG. 10 is a view similar to FIG. 8 under fifth condition.

FIG. 10 shows a cross-section of a groove 2 formed by a YAG pulse laser under the following conditions.
Material of sliding surface 1: Al$_2$O$_3$
Mean power of the pulse laser: 18 Watt
Pulse repetition of the pulse laser: 10 kHz
Energy density of the pulse laser: 180 J/cm$^2$ The groove shown in FIG. 10 has a cross-sectional configuration that the depth is about 2 μm and the width is about 1.5 mm, and no burrs along the groove. The energy density is not sufficient to form a groove in a good shape in the condition shown in FIG. 10.

There are following relationships with respect to an energy density, mean power and a width of pulse.

mean power (w)=peak power (kw)×width of pulse (ns)×pulse repetition (kHz)

energy density (J/cm$^2$)=mean power (w)/working area (cm$^2$)

In order to avoid generating burrs at the edges of the grooves, it is found that the YAG pulse laser beam employed in the present invention should have a dimension that the mean power is 100 Watt and below, the pulse repetition is 3 to 10 kHz, and the energy density is 300 J/cm$^2$ and below for SiC or Si$_3$N$_4$, 200 to 600 J/cm$^2$ for Al$_2$O$_3$.

It is found that there is the following relation between generation of burrs at the edges of the grooves and the energy density:

| Energy density (J/cm$^2$) | Generation of burrs |
| --- | --- |
| 150 | NO |
| 210 | NO |
| 270 | NO |
| 300 | NO |
| 330 | YES |
| 390 | YES |

Although in the foregoing embodiment a Q-switch YAG laser beam is employed as an energy beam with a high energy density, it should be noted that the present invention is not necessarily limitative thereto and that an excimer laser beam may also be applied by use of an excimer laser irradiation device. In this case, the energy density of the excimer laser beam is set to be not higher than 20 J/cm$^2$. If the energy density of the excimer laser beam exceeds 20 J/cm$^2$, microcracks are generated in the modification layer 2a. Therefore, it is necessary to set the energy density at a level which is not higher than 20 J/cm$^2$ and at which the base material can be removed.

In the above-described embodiment, an XY table is employed to scan the surface of the bearing base with the laser beam at a rate of 5 mm/s. However, the laser beam scanning means is not limited to the XY table. It is possible to employ either a galvanometer type optical scanner system wherein a laser beam is transmitted in a scanning motion by use of a galvanomirror, or an optical fiber system wherein the distal end of an optical fiber that transmits a laser beam is moved in a scanning motion. In addition, a mask may be used jointly.

EFFECTS OF THE INVENTION

As has been described above, the present invention provides the following advantageous effects:

(1) Since the machined surface that is formed with hydrodynamic pressure generating grooves is coated with a modification layer with a smooth surface which is formed by melting and solidifying the ceramic base material, it is possible to minimize or eliminate the generation of fine particles.

(2) Since it is possible to form a modification layer with a smooth surface by melting and solidifying the ceramic base material at the same time as groove cutting process is carried out, hydrodynamic pressure generating grooves with no or minimal generation of fine particles can be formed extremely easily.

(3) Since the modification layer that is formed on the surfaces of the hydrodynamic pressure generating grooves is attended with substantially no microcracks or no cracks that are contiguous with each other, it is possible to prevent separation of the modification layer and development of microcracks.

(4) The advantageous effects (2) and (3) enhance the reliability of the product.

(5) Since washing is not needed to remove the abrasive or cuttings attached to the machined portion as in the conventional groove cutting process by shot blasting, the load in the washing process can be reduced.

(6) Since cutting of hydrodynamic pressure generating grooves can be carried out in the atmosphere, the machining equipment can be simplified.

(7) Since no burrs are formed at the circumferential edges of the grooves, no finishing process after forming the grooves are necessary in the method according to the present invention.

What is claimed is:

1. A method of cutting grooves in a ceramic hydrodynamic bearing, wherein a sliding surface of a bearing base made of a ceramic material is irradiated with an energy beam with a high energy density from an energy beam irradiation device to remove said ceramic material, thereby forming hydrodynamic pressure generating grooves with a predetermined configuration without generating burrs along the grooves, and at the same time, coating the inner surfaces of said hydrodynamic pressure generating grooves with a modification layer that is formed by melting and solidifying said ceramic material of said bearing base.

2. The method of claim 1, wherein said ceramic bearing base is made of a ceramic material selected from among SiC, Si$_2$N$_4$, and Q-switch YAG laser device is employed as said energy beam irradiation device to apply a YAG pulse laser beam with an energy density of not higher than 300 J/cm$^2$, thereby forming said hydrodynamic pressure generating grooves and, at the same time, forming said modification layer on the surfaces thereof.

3. The method of claim 1, wherein said ceramic bearing base is made of a ceramic material from Al$_2$O$_3$, and a Q-switch YAG laser device is employed as said energy beam irradiation device to apply a YAG pulse laser beam with an energy density of 200 to 600 J/cm$^2$, thereby forming said hydrodynamic pressure generating grooves and, at the same time, forming said modification layer on the surfaces thereof.

4. The method as claimed in claim 1, wherein said bearing is used as a radial or a thrust bearing in a spindle motor for a hard disk driver.

5. The method as claimed in claim 1, wherein said pressure generating groove has a cross section the depth of which is from 3 to 20 microns and the ratio of the depth to the width of said pressure generating groove is from $10^{-4}$ to $10^{-2}$.

6. The method as claimed in claim 2, wherein said bearing is used as a radial or a thrust bearing in a spindle motor for a hard disk driver.

7. The method as claimed in claim 3, wherein said bearing is used as a radial or a thrust bearing in a spindle motor for a hard disk driver.

8. The method as claimed in claim 2, wherein said pressure generating groove has a cross section the depth of which is from 3 to 20 microns and the ratio of the depth to the width of said pressure generating groove is from $10^{-4}$ to $10^{-2}$.

9. The method as claimed in claim 3, wherein said pressure generating groove has a cross section the depth of which is from 3 to 20 microns and the ratio of the depth to the width of said pressure generating groove is from $10^{-4}$ to $10^{-2}$.

* * * * *